Feb. 19, 1952   R. W. HODGSON ET AL   2,586,043
KINETIC BOOM DAMPER

Filed Oct. 14, 1950   2 SHEETS—SHEET 1

INVENTORS:
RICHARD W. HODGSON
NORMAN C. PARRISH

By Herbert E. Metcalf

THEIR PATENT ATTORNEY

Feb. 19, 1952  R. W. HODGSON ET AL  2,586,043
KINETIC BOOM DAMPER
Filed Oct. 14, 1950  2 SHEETS—SHEET 2

INVENTORS:
RICHARD W. HODGSON
NORMAN C. PARRISH

By Herbert E. Metcalf

THEIR PATENT ATTORNEY

UNITED STATES PATENT OFFICE 2,586,043

KINETIC BOOM DAMPER

Richard W. Hodgson, Compton, and Norman C. Parrish, Redondo Beach, Calif., assignors to Northrop Aircraft, Inc., Hawthorne, Calif., a corporation of California Application October 14, 1950, Serial No. 190,116

5 Claims. (Cl. 188—1)

Our invention relates to vibration damping, and more specifically to a vibration damper suitable for use in instrumentation booms and instrument supporting masts of tubular construction used on high speed aircraft.

It has been found that accurate airflow instrumentation data often cannot be obtained from instrumentation devices located adjacent the main structure of high speed aircraft. Tubular booms and masts carrying pilot tubes, yaw indicators, pitch indicators and the like are mounted and attached to structure remote from the main body of the air craft and project forwardly of the aircraft.

While most booms prove satisfactory and are sufficiently strong under normal conditions at extremely high speeds of flight, severe radial vibrations can develop in the instrumentation boom which, if allowed to continue unchecked, may damage the boom and the devices mounted therein or thereon.

It is often necessary to attach apparatus for obtaining flight test data to the external surface of booms and masts on aircraft in such a manner that the weight load is unequally distributed with respect to the boom axis, creating an occational factor leading to vibration.

It is the object of our invention to provide an efficient vibration damper suitable for use in conjunction with booms and masts of tubular construction which are rigidly supported at one end and subject to radial vibration when in use.

It is another object of our invention to provide an efficient vibration damper suitable for use in conjunction with booms and masts of tubular construction which are compact, of low weight, and add a minimum of drag when in use on aircraft.

It is another object of our invention to provide an efficient vibration damper for use in conjunction with booms and masts of tubular construction which is wholly internally contained in the booms.

It is another object of our invention to provide an efficient vibration damper suitable for use in aircraft instrumentation booms and masts of tubular construction wherein the internal installation of tubing and wire will not be materially restricted.

It is another object of our invention to provide an efficient vibration damper for use in conjunction with booms and masts of tubular construction which is fully adjustable to compensate for eccentric loading of the boom.

It is another object of our invention to provide an efficient vibration damper which is fully adjustable and which can be calibrated into predetermined increments for accurate alignment.

Other objects of our invention will be apparent as the description continues.

As applied to aircraft instrumentation booms of tubular construction having a number of airflow instrumentation devices unequally distributed along and attached to the outer surface of the boom only, our invention may take the form of a hollow boom, slidably embracing a base support of cylindrical contour, and means for fastening the base support at any desired point along the inner chamber of the boom. The support cylinder eccentrically encircles a proportionately smaller rotatable vernier cylinder, one end of which is calibrated with the support cylinder into certain increments, for accurate adjustment. A setscrew holds the vernier cylinder in any desired position. A flexible rod-shaped tempered spring of substantial length and circular section, extends eccentrically through the vernier cylinder and projects outwardly from each end thereof, providing flexible cantilever beams of approximately equal length. A weight is slidably mounted on each cantilever beam and is controllably positioned between springs encompassing each cantilever beam by an annular collar encircling the end of each cantilever beam and fastened into place by a cotter-pin or equivalent means.

A variation of our invention is utilized when the instrumentation boom has a number of tubes and wires passing between the inner wall of the boom and the outer periphery of the support cylinder. In such instances, the support cylinder preferably has a number of longtitudinal grooves or slots on the outer periphery, of sufficient depth to permit the passage of tubes and wires around the support cylinder. It is preferred, when tubes and wires must be installed in the manner described above, to have the flexible cantilevers limited in movement to one plane so that damage to the tubing and wires, resulting from being struck by the cantilever weights, when in motion, is prevented.

The use of a leaf-type cantilever beam of rectangular section instead of the rod-shaped cantilever beam limits the direction of movement to one plane, while the selection of directional motion is facilitated by the rotatable vernier cylinder. It is to be noted that the longitudinal grooves in the support cylinder should preferably be placed in diametric opposition to the plane of movement of the cantilevers.

The support cylinder provides a central base for the two leaf-type cantilever beams, which in this case have slidable weights controlled in position by coil springs, encompassing the cantilever on each side, and abutting each end of the weights. Each weight is, thereby, free to frictionally shift position toward the outer end of the cantilever beam upon which it is mounted, against a certain spring pressure, or forced back to the original position by the opposing spring pressure. As the vibration amplitude of the enclosing boom increases, the natural frequency of vibration of the cantilevers, vibrating in sympathy with the boom, is lowered to approach the vibration frequency of the boom by an outward sliding motion of the weights, thereby producing an increasingly out-of-phase vibration and impact which substantially overcomes and efficiently damps the vibration of the boom in the incipient stage.

Our invention will be more clearly understood by referring to the drawings, wherein.

Figure 1:
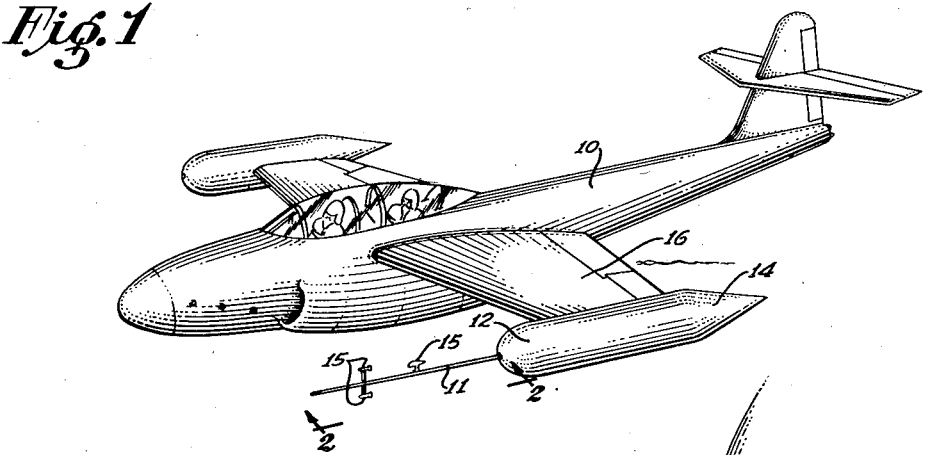
Figure 1 is a diagrammatic view, in perspective, of a Northrop F-89 air force jet-propelled airplane having an instrumentation boom mounted thereon.
Figure 2:
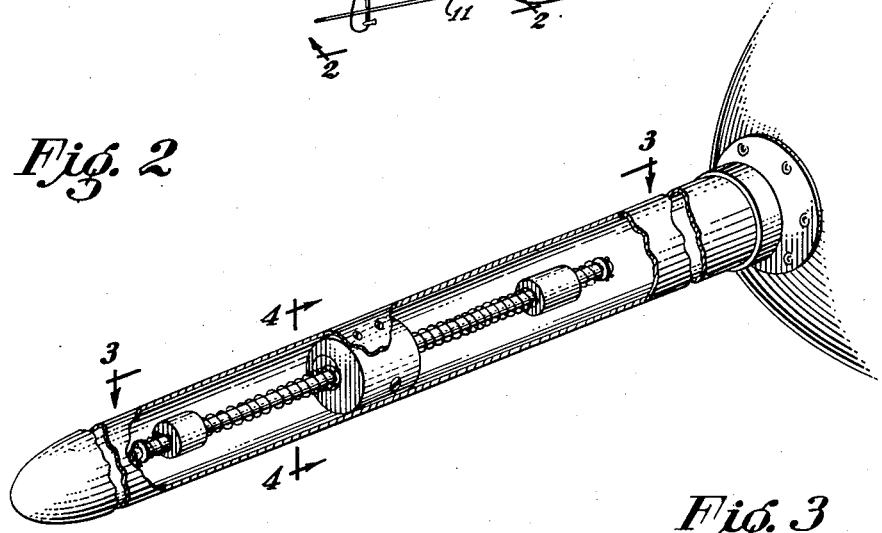
Figure 2 is a diagrammatic cutaway view, in perspective, of a section of the boom, as indicated by line 2—2, Figure 1, showing one embodiment of our invention.

Referring to Figure 1, a high-speed aircraft 10 is equipped with a forwardly projecting boom 11 of tubular construction, firmly mounted and attached to supporting structure (not shown) in the nose 12 of a left wing-tank 14. One particular boom 11 is approximately 5 feet long, has an outside diameter of about 3 inches, a wall thickness of .109 inch, and carries a number of instrumentation devices 15 on the outer surface, for measuring force, yaw and pitch for example, which transmit the data rearwardly through the boom 11, wing-tank 14, and wing 16 to related indicating devices (not shown) in the aircraft 10. The boom 11 as shown in Figure 1 is, in this example, placed on the nose 12 of the wing-tank 14 for purposes of collecting instrumentation data on the effects of forces, exerted at high rates of speed, upon the wing 16. In many cases, instrumentation booms of the same type are placed on the nose of the fuselage of the aircraft. Instrumentation booms and instrument supporting masts so constructed and supported have generally been found satisfactory when used on comparatively low speed aircraft, but at relatively high speeds of flight such booms will, under certain flight conditions, develop radial vibrations which will eventually inflict damage to the boom and the devices carried thereby.

Figure 3:
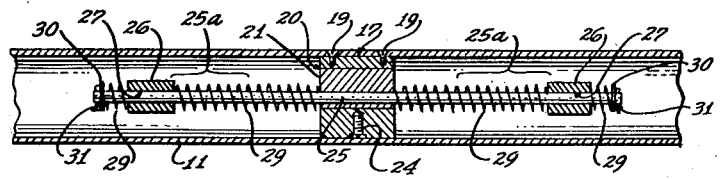
Figure 3 is a cross-sectional view taken on line 3—3, Figure 2.
Figure 4:
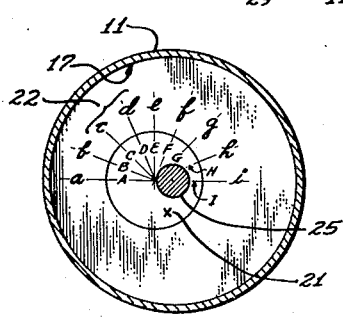
Figure 4 is a sectional view of a cantilever beam and end view of a vernier cylinder as indicated by line 4—4, Figure 2.

As shown in Figure 3, one particular embodiment of our invention as applied to hollow booms, consists of a cylindrically shaped support 17 slidably enclosed at a certain point within the boom 11 and fastened thereto by means of mounting screws 19. The support cylinder 17 has a longitudinal off-center bore 20 through its section receiving and eccentrically encircling a rotatable vernier cylinder 21. The vernier cylinder 21 is match-calibrated with the support cylinder 17 into predetermined increments 22, as best shown in Figure 4, for accurate adjustment when compensation for unequal loading of boom 11 is necessary. A setscrew 24 is provided as means for holding the vernier cylinder 21 in position after adjustment has been made.

Figure 5:
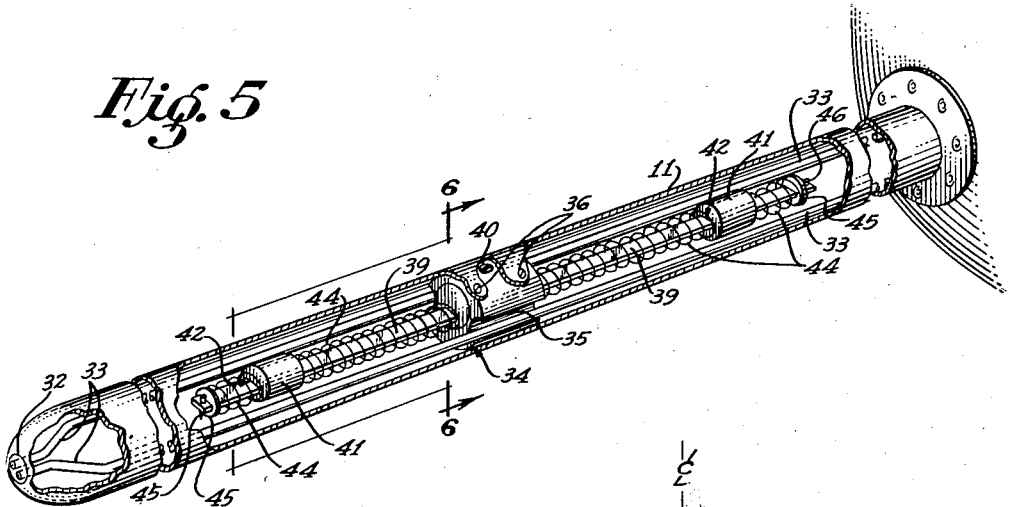
Figure 5 is a perspective view of a variation of our invention using leaf-type cantilever beams.

A rod-shaped tempered spring 25 of circular section eccentrically extends longitudinally through the section of the vernier cylinder 21 and projects outwardly from each end of the vernier cylinder 21, providing flexible cantilever beams 25a of approximately equal length. Normally the cantilever beams 25a are positioned coaxial to the center of the support cylinder 17 as shown in Figure 5, but their position, related to unequal loads, can be altered by loosening the setscrew 24 and rotating the vernier cylinder 21 to any desired position. Calibrations 22, Figure 4, etched or stamped into the end of the support cylinder 17 and the corresponding vernier cylinder 21, facilitate the accurate positioning of the cantilever beams 25a. A cylindrically contoured weight 26 having a circular longitudinal bore 27 through its section, of a diameter to slidably receive a cantilever beam 25a, is slidably mounted on each cantilever beam 25a and is positioned between coils springs 29 which encompass the cantilever beams 25a on each side of the weight 26, as best shown in Figure 3. The coil springs 29 and weight 26 are retained on each cantilever beam 25a by an annular collar 30 encircling the end of each cantilever beam 25a fastened in place by means of a cotter-pin 31. The weights 26 and springs 29 are so proportioned and positioned on the cantilever beams 25a that radial vibration of the boom 11 inertially shifts the slidable weights 26 outwardly from the central support cylinder 17. As the vibration amplitude of the boom increases, the increasingly lagging phase reached by the resonating cantilever beams 25a, increasing their vibration amplitude proportionately, efficiently damps out boom vibration in the incipient stage.

Referring to Figure 5, a variation of our invention is shown wherein pilot air pressure data is required. The boom 11 is here provided with a small aperture 32 at the forward end permitting the entrance of air pressure into the open ends of tubes 33 connected at the aperture 32. The air pressure data is then transmitted rearwardly and axially through the boom 11, wing-tank 14, wing 16 and into the aircraft 10, Figure 1, to related devices (not shown). It is, therefore, obvious that the tubes 33 must bypass a support cylinder 34, and this is accomplished by means of a support cylinder 34 having a number of longitudinal concave slots 35 on the outer periphery, of sufficient radius to allow axial installation of tubes 33 around the support cylinder 34, and means to secure the support cylinder 34 in a desired location, mounting screws 36 are used for example. The support cylinder 34 eccentrically encircles a vernier cylinder 37 having a leaf-type tempered spring 39 of rectangular eccentrically extending through the section and projecting outwardly from each end, providing cantilever beams 39 of approximately equal length. A setscrew 40 is provided as means for locking the vernier cylinder 37 in place.

Figure 6:
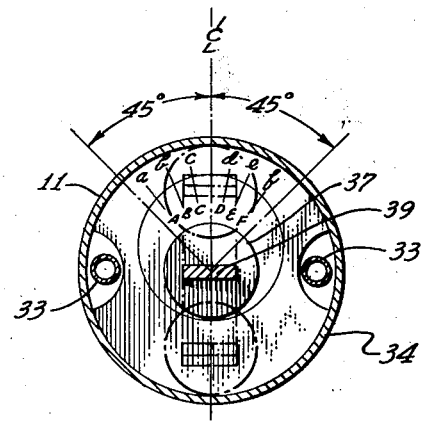
Figure 6 is a sectional view of a cantilever beam, and end view of a vernier cylinder and support cylinder as indicated by line 6—6, Figure 5.

Weights 41 of cylindrical contour, having a longitudinal rectangular bore 42 running axially through their section, are slidably mounted on each cantilever beam 39a and are controllably positioned between coil springs 44 enclosing the cantilever beams. The springs 44 and weights 41 are retained on their respective cantilever beams 39a by annular collars 45 encompassing the ends of each cantilever beam 39 and fastened in position by cotter-pins 46, for example. The movement of the cantilever beams 39 and weights 41 is restricted to one plane, as indicated in Figure 6. The concave slots 35 are positioned in diametric opposition to the plane of movement, thereby avoiding damage to the tubes 33 by the weights 41 when in motion. The range of adjustment of the vernier cylinder 37 is sufficiently wide, as indicated in Figure 6, to cover most conditions of unequal loading of instrumentation booms.

Figure 7:
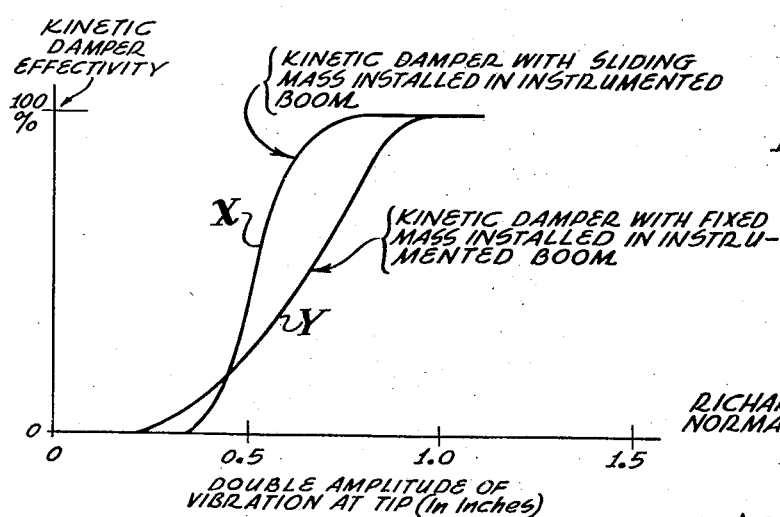
Figure 7 is a simplified graph showing the effectivity curves of two types of kinetic vibration dampers.

In a vibrating instrumentation boom, the vibration damping effectivity of a kinetic vibration damper increases somewhat as demonstrated in the simplified graph shown in Figure 7. In this figure, curve X represents the damping action when a sliding mass is used, and curve Y relates to the action of a fixed mass damper.

It may be seen that the damper illustrated with curve Y commences to damp the vibratory motion of the boom at a lower boom vibration amplitude than the damper X; however, the damper X reaches a maximum damping effectivity at a lower boom vibration amplitude than does damper Y. This variance of damping efficiency is caused by the necessity of adjusting any fixed mass damper, such as damper Y, so its natural vibratory frequency is close but never completely resonant with the natural frequency of the boom. If damper Y were adjusted to resonate with the boom, vibratory energy could easily be transmitted bi-directionally between the boom and the damper, the direction of energy flow being dependent upon which element contained a greater energy. It has been proven in practice that a kinetic damper element can induce vibrations in its enclosing boom if their natural frequencies coincide.

Damper X, however, is not resonant with its enclosing boom until fairly high boom vibration amplitudes are present. When this condition occurs, the energy content of the boom considerably exceeds that of the damper, and, as the damper is then resonant to the boom vibration frequency, energy is drawn from the boom to the damper at a high rate, thus rapidly reducing the boom energy content and thereby reducing its vibration amplitude.

It can be concluded upon comparing the effectivity curve of each type of vibration damper, that the vibration damper having the spring controlled sliding mass damps high amplitude boom vibration faster than the vibration damper having the fixed mass.

As vibration of high-speed aircraft is often generally more pronounced in the vertical plane, and may be reasonably negligible in the lateral plane, the use of our invention in the latter embodiment, with the wide range of adjustment, will prove satisfactory in most cases. Where instrumentation devices are applied to the exterior surfaces only of booms and masts on aircraft, however, the embodiment of our invention first disclosed may be preferable.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute, the invention has been described in language more or less specific as to structural features, it is to be understood that the invention is not limited to the specific features shown, but that the means and construction herein disclosed comprise the preferred form of several modes of putting the invention into effect, and the invention is, therefore, claimed in any of its forms or modifications within the legitimate and valid scope of the appended claims.

What is claimed is:

1. A vibration damper comprising a tube supported at one end and subject to radial vibration, a fixed support in said tube, a rotatable cylinder eccentrically encircled by said fixed support, a flexible cantilever beam projecting eccentrically from each end of said cylinder, weights slidably mounted adjacent the end of each cantilever beam, resilient means for controlling the axial movement and position of said weights, and means for locking said rotatable cylinder in any desired position in relation to said support.

2. A vibration damper comprising a tube supported at one end and subject to radial vibration, a fixed support in said tube, a rotatable vernier cylinder eccentrically encircled by said fixed support, a flexible cantilever beam projecting eccentrically from each end of said vernier cylinder, weights slidably mounted adjacent the end of each cantilever beam, resilient means for controlling the axial movement and position of said weights, said vernier cylinder being suitably match-calibrated with said support into predetermined increments for alignment of said flexible cantilever beams with respect to the axis of said tube.

3. A vibration damper comprising a tube supported at one end and subject to radial vibration, a fixed support in said tube, said support having a number of longitudinal concave slots on its outer periphery of sufficient radius to allow the passage of tubes or wires around said support, a rotatable cylinder eccentrically encircled by said fixed support, a flexible cantilever beam projecting eccentrically from each end of said cylinder, weights slidably mounted adjacent the end of each cantilever beam, resilient means for controlling the axial movement and position of said weights, and means for locking said rotatable cylinder in any desired position in relation to said support.

4. A vibration damper comprising a tube supported at one end and subject to radial vibration, a fixed support in said tube, said support having a number of longitudinal concave slots on its outer periphery to allow the passage of tubes or wires around said support, a rotatable vernier cylinder eccentrically encircled by said fixed support, a flexible cantilever beam projecting eccentrically from each end of said vernier cylinder, weights slidably mounted adjacent the end of each cantilever beam, resilient means for controlling the axial movement and position of said weights, said vernier cylinder being suitably match-calibrated with said support into predetermined increments for alignment of said flexible cantilever beams with respect to the axis of said tube.

5. A vibration damper comprising a tube supported at one end and subject to radial vibration, a fixed support in said tube, said support having a number of longitudinal concave slots on its outer periphery of sufficient radius to allow the passage of tubes or wires around said support, a rotatable cylinder eccentrically encircled by said fixed support, a flexible cantilever beam projecting eccentrically from each end of said cylinder, said cantilever beam being of substantially rectangular section and limited in movement, thereby, to one plane, weights slidably mounted adjacent the end of each cantilever beam, resilient means for controlling the axial movement and position of said weights, and means for locking said rotatable cylinder in any desired position in relation to the axis of said tube.

RICHARD W. HODGSON.
NORMAN C. PARRISH.

REFERENCES CITED

The following references are of record in the file of this patent:

UNITED STATES PATENTS

| Number | Name | Date |
|---|---|---|
| 1,763,064 | Paton et al. | June 10, 1930 |
| 1,855,570 | Edison | Apr. 26, 1932 |
| 2,028,930 | Taylor | Jan. 28, 1936 |